United States Patent [19]

Fink

[11] 4,313,157

[45] Jan. 26, 1982

[54] CAPACITIVE NETWORK

[75] Inventor: Rudolf Fink, Selb, Fed. Rep. of Germany

[73] Assignee: Draloric Electronic GmbH, Fed. Rep. of Germany

[21] Appl. No.: 76,270

[22] Filed: Sep. 17, 1979

[30] Foreign Application Priority Data

Sep. 26, 1978 [DE] Fed. Rep. of Germany ....... 2841742

[51] Int. Cl.³ .............................................. H01G 4/40
[52] U.S. Cl. ..................................... 363/59; 361/308; 361/321; 361/328
[58] Field of Search ....................... 361/308, 321, 328; 363/59, 60

[56] References Cited

U.S. PATENT DOCUMENTS 2,919,463  1/1960  Gravley ........................... 361/321 X
3,466,513  9/1969  Belko .............................. 361/308 X
4,074,340  2/1978  Leigh ................................. 361/321

FOREIGN PATENT DOCUMENTS 1764214  7/1972  Fed. Rep. of Germany .
7403572  1/1974  Fed. Rep. of Germany .
1764861  3/1974  Fed. Rep. of Germany .
1940036  4/1975  Fed. Rep. of Germany .
2545596  4/1978  Fed. Rep. of Germany .

OTHER PUBLICATIONS

Catalog #8000 M1 of Erie Electronic GmbH Monobloc Chips High Voltage Capacitors.
Catalog of Draloric "Electronic Ceramic Cap.," 1975 Edition p. 118.

Primary Examiner—Elliot A. Goldberg

[57] ABSTRACT

The disclosure concerns a capacitive network and also concerns the individual metal layer carrying dielectric layers of which the capacitive network is comprised. Each dielectric layer is comprised of a flat plate having one or two rows of metal layers printed on one surface of it. At least one or perhaps both of the opposite edges of the dielectric layers are formed with grooves or incisions that define respective electric contact areas. There is a respective row of metal layers on the dielectric layer for each edge with grooves. Each metal layer is shaped to have a respective lead portion that extends toward a respective adjacent groove. The lead portions from the metal layers extend toward a first set of alternate grooves, leaving the second alternate set of contact areas not receiving an electric lead of that dielectric layer. Two dielectric layers are overlaid so that their respective rows of metal layers are in overlapping relationship but the dielectric layers are oriented so that metal layers on adjacent dielectric layers are always separate by a layer of dielectric material. The positions of the metal layers on one cooperating dielecetric layer are staggered along the length of the respective dielectric layer with respect to the positions of the metal layers on the adjacent dielectric layer, so that the leads of the metal layers on the adjacent dielectric layer extend toward the second set of alternate grooves, toward which the leads from the metal layers of the first dielectric layer did not extend. Electric diodes may be electrically connected between the grooves, whereby the diodes are connected in series along the grooves.

16 Claims, 11 Drawing Figures

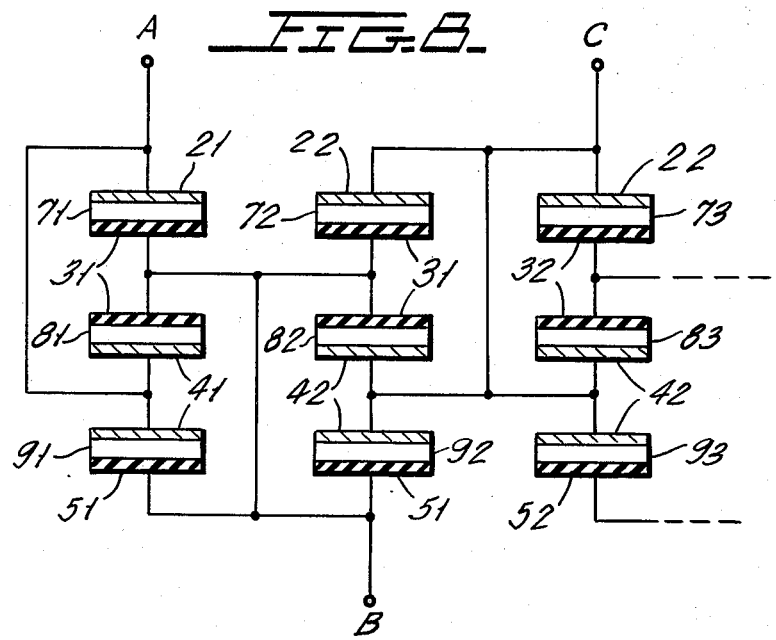
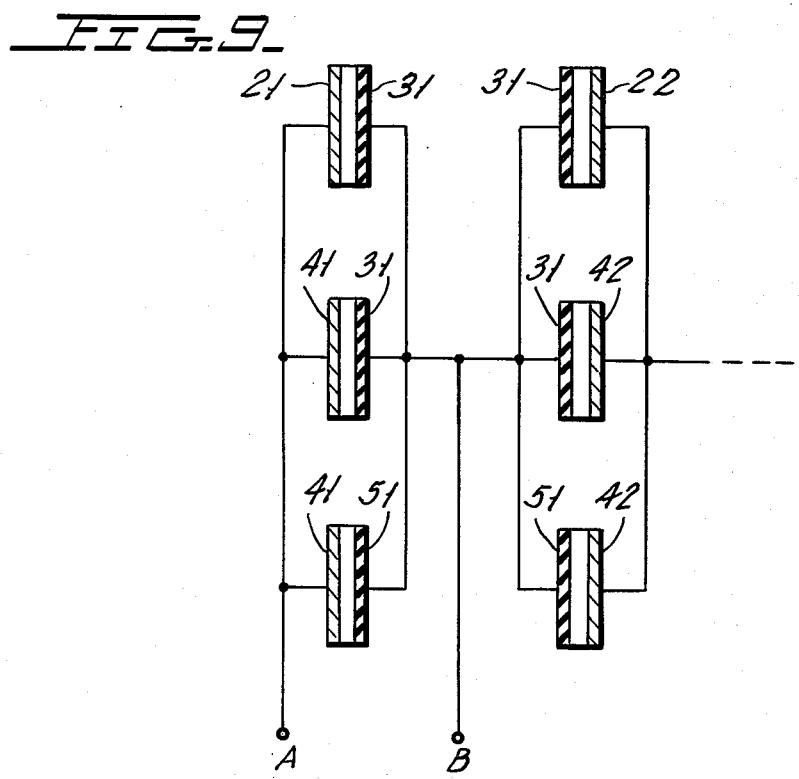

CAPACITIVE NETWORK

BACKGROUND OF THE INVENTION

1. Field of the Invention

The invention relates to a capactive network comprised of a plurality of layers of dielectric material, each of which layers is printed with a plurality of metal layers, and the dielectric layers are stacked to define the capactive network. A plurality of electric leads are defined by the configurations of the dielectric layers and the metal layers.

2. The Prior Art

A capacitive network having the features described above is shown in Federal Republic of Germany Provisional Patent (Auslegeschrift) 2 545 596. In this reference, the dielectric layers have projections or feet extending from one side thereof. The metal layers supported on the dielectric layers themselves extend out at the base surfaces of the projections. The metal layers are metallized there so as to be capable of being soldered. Where such a capactive network is used in a voltage multiplier cascade, which includes diodes therein, the diodes are soldered to the metallizations on the projections of the dielectric layer. As a result, the lead wires of the diodes can shift and this will result in poor contact between the diodes and the capacitive network.

Federal Republic of Germany Provisional Patent (Auslegeschrift) 1 764 214 shows a capacitor comprised of a dielectric body also having projections or feet located laterally of each other. A lead extends from each metal or electrode layer to one of the projections. This capacitor is suitable for use in capacitor cascades. However, a significant number of these capacitors must be placed in a row and then be soldered together in order to provide a cascade block. The use of solder connections reduces the mechanical strength of such a cascade block, unless the entire block is soldered onto a mounting body that has been provided with line paths.

Federal Republic of Germany Provisional Patent (Auslegeschrift) 1 940 036 shows a capacitive network which consists of two superimposed capacitor units which are electrically separated from each other by an insulating layer. These capacitor units produce internal series connections, which are then connected together by external connections. It is not desired or possible to tap the internal series connection capacitance by capacitance on the surface of the dielectric body, since this capacitive network concerns an x-y noise suppressor capacitor, and not a capacitor cascade.

Federal Republic of Germany Pat. No. 1,764,861 shows an end contacted capacitive network. A multilayer capacitor containing metal electrode layers and dielectric layers staggered above each other is divided by incisions or slots into a plurality of individual capacitors which are electrically connected. The incisions or slots extend transverse to the narrow sides at which the electrode layers merge and the incisions also extend over the entire width of the overlapping region of the electrode coatings of opposite polarity. Regions of the narrow sides are also metallized. Therefore, when such a network is used in a voltage multiplier cascade, the lead wires of the diodes are placed on the narrow sides and must be soldered there, without these wires having any particular protection against being shifted.

Federal Republic of Germany Petty Patent (Gebrauchsmuster) 7 403 572 shows a single body wound capacitor having lead wires extending from a round body. This capacitor is for use in high voltage rectifier cascades in which two films of insulating material are wound up with a plurality of metal strips located side-by-side. Strips of the one insulating film form series connected capacitances with strips of the other insulating film.

Catalog No. 8000 M1 of Erie Electronic GmbH "Monobloc Chips" High Voltage Capacitor shows multichips in which chip capacitors with electrodes are arranged side-by-side in a dielectric body. The capacitors are connected in series by conductive paths that are printed on the narrow sides. In this way, a cascade block is formed. With this construction, great attention must be paid to the position of the screen printing mask with respect to the body of the capacitor in order that the metallization be applied at precisely the correct places, that two narrow sides must be metallized, one after the other, and that the screen of the screen printing device is subjected to increased wear upon printing of densely sintered, sharp edged, dielectric bodies.

Another capacitor cascade is known from a catalog of Draloric Electronic GmbH, entitled "Ceramic Capacitors" 1975 Edition, pages 118 et. seq. Ceramic disk capacitors are connected in series by metallic spacers. This structure is limited in the capacitance values of the individual disks to relatively low values.

SUMMARY OF THE INVENTION

It is the primary object of the present invention to provide an improved capacitive network.

It is another object of the invention to provide such a network, and particularly a capacitor cascade, useful for voltage multiplication.

It is a further object of the invention to provide an improved dielectric layer which is to be printed with metal layers.

It is yet another object of the invention to connect a series of diodes in a capacitve network.

It is a further object of the invention to provide such a capacitive network wherein lead wires of the diodes connected thereto can be wound in a continuous row and in a simple manner on the capacitive network and be held securely there until they are soldered.

The invention provides a capacitive network and also provides individual layers adapted for fabrication of a capacitive network. A capacitive network according to the invention is provided. It is comprised of a dielectric body and the dielectric body is formed from a stack of layers of dielectric material, wherein each dielectric layer carries at least one, and more usually two, rows of separated metal layers printed on one surface. At successive layers in the stack, the metal layers are staggered in position along the dielectric layers so that, for example, an individual metal layer on one dielectric layer is above and is spaced by a dielectric layer from a respective part of two adjacent metal layers on the adjacent dielectric layer.

Each dielectric layer has incisions, grooves or slots defined along at least one edge thereof. In the stack of dielectric layers, all grooves in each layer are aligned with the respective corresponding grooves in the other dielectric layers. A respective metal layer has an internal lead therefrom extending up to and at least partially surrounding each incision or groove. Thus, each groove defines a contact area for the lead that extends to it. Each metal layer is of a length along the dielectric layer to extend past two of the incisions or grooves. However, the lead from each metal layer extends toward only one of the grooves whereby in each row of metal layers, the lead of each successive metal layer extends to every other or alternate groove. No lead extends to the other alternate grooves. In the adjacent dielectric layer in the stack, the metal layers have the same characteristics. But because the metal layers of the adjacent dielectric layer are staggered with respect to the metal layers on the first dielectric layer, the metal layers on the adjacent dielectric layer extend to the alternate incisions or grooves from the first dielectric layer.

At each groove or incision, a conductive metallization extends completely across the dielectric layer stack, thereby electrically connecting in parallel the superimposed metal layers of the alternate dielectric layers. In this way also, series connection of the capacitances is obtained.

In an alternate, preferred embodiment, each dielectric layer supports two parallel rows of generally equivalent metal layers. Along the opposite edges of each dielectric layer, respective incisions or grooves are defined. Each row of metal layers cooperates with the respective row of grooves at the adjacent edge of the dielectric layer. The grooves along both opposite edges are uniformly sized and are uniformly spaced apart along their respective edge. The grooves or incisions along one of the opposite edges of each dielectric layer are staggered in position with respect to the positions of the corresponding incisions and grooves along the other edge. Correspondingly, the metal layers in one row on each dielectric layer are staggered in position with respect to the positions along their row of the metal layers in the other row of metal layers. The corresponding row of metal layers along the same edge of the various dielectric layers in alternate dielectric layers in a stack of dielectric layers are staggered as described above for a single row of dielectric layers. As noted above, each groove or incision is metallized across the dielectric layer stack with a conductive metal for electrically connecting in parallel the superimposed metal layers in both rows of alternate dielectric layers. In this way also, series connection of the capacitances in both rows is obtained.

A series of diodes may be connected to the conductive metallized layers in the capacitive network. The lead wires from each diode electrically communicate with the metallized layers in the grooves and are perhaps soldered there. In the capacitive network involving two rows of metal layers, and especially wherein the positions of the rows of the metal layers above are staggered as described with respect to the aligned incisions or grooves in the dielectric body, it is possible to have a continuous, spirally wound lead wire which is wrapped into each groove, along which continuous wire the diodes are correctly positioned so that the series network of capacitances is created.

The invention has a number of benefits. Overlapping positions of metal layers on adjacent dielectric layers provides series connection of the individual capacitances within the dielectric body. Because the leads of the metal layers extend into the incisions or grooves formed in the dielectric bodies, this eases connection of the diodes required for voltage multiplier circuits to the metallization layers formed in the grooves or incisions.

The above described capacitive networks are usually or preferably used in voltage multiplication arrangements, wherein two capacitor chains connected in series produce a cascade by means of diodes. The latter described embodiment of the invention, wherein there are two rows of metal layers and two sets of grooves of incisions along opposite edges of the dielectric layers facilitates this type of arrangement, using diodes.

Another advantage of the invention is that the capacitive network can be manufactured in quite simple fashion. It has considerable mechanical strength and it uses up little space. Another advantage where the capacitive network is used in a voltage multiplication circuit is that the two rows of capacitors for the voltage multiplication circuit are made available in a single dielectric body. The required diodes in a chain thereof can be directly located on and supported in the dielectric body.

Other objects and features of the invention will become apparent from the following description and accompanying drawings.

BRIEF DESCRIPTION OF THE DRAWINGS

FIG. 6 is a side view of a stack of dielectric layers in accordance with FIG. 7 viewed from the bottom of FIG. 7 and showing the positions of the metal layers inside the stack of dielectric layers;

FIG. 9 is a simplified equivalent circuit diagram to FIG. 8.

DESCRIPTION OF THE PREFERRED EMBODIMENTS

Figure 1A:
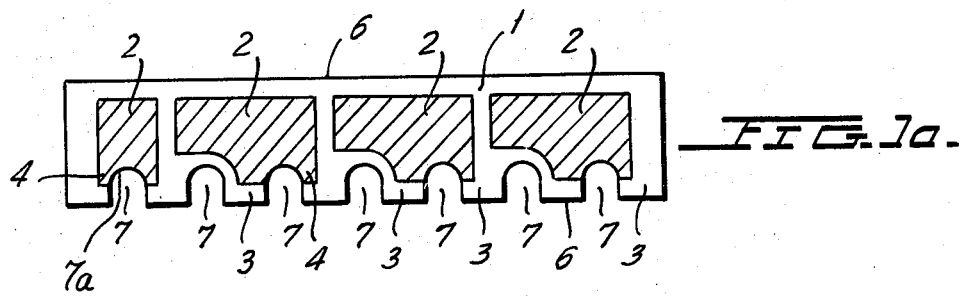
FIG. 1a shows a first dielectric layer that has been printed with metal layers.

FIG. 1a shows a first embodiment of a dielectric layer 1, comprised of a quite thin layer of dielectric ceramic material. The dielectric layer 1 has a row of uniformly spaced apart uniform size incisions or grooves 7 defined along one elongated side 6 thereof. Projections or feet 3 are formed between neighboring incisions or grooves 7. Each groove 7 extends from a base portion 7a to the side 6 of the dielectric layer 1.

One surface of dielectric layer 1 is printed with relatively large surface area metal layers 2 formed of palladium, platinum, silver, or the like metal. Each metal layer 2 is shaped so as to define a respective electric lead portion 4 thereof that extends up to and into the base of the respective incision or groove 7 between the two feet so that electric contact can be made with that lead. The leads 4 from successive metal layers 2 in a row extend to alternate grooves 7, whereby there is no lead 4 to the other alternate incisions on the dielectric layer 1. Each metal layer 2 extends along the length of the dielectric layer 1 for about two incisions or groove 7. Furthermore, both of the longitudinal ends of the metal layer 2 terminate between the sides of a foot or projection 3 between adjacent incisions or grooves 7. Each lead 4 extends outwardly along the projections 3 approximately halfway toward the edge of the side 6.

Figure 1B:
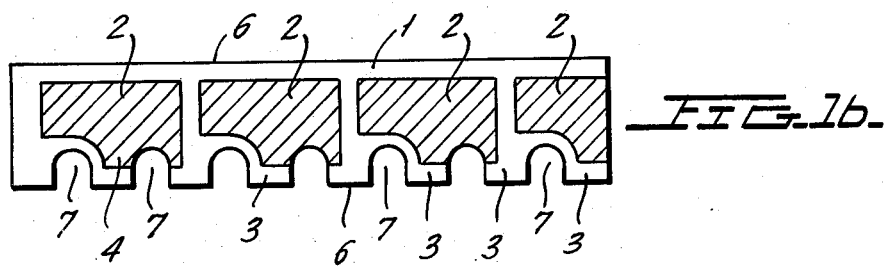
FIG. 1b shows a second dielectric layer that has also been printed with metal layers, wherein the metal layers of the second dielectric layer are staggered in position with respect to the metal layers on the first dielectric layer.

FIG. 1b illustrates a similar dielectric layer 1 having a contour that corresponds to the contour of the dielectric layer 1 of FIG. 1a, including the grooves or incisions 7 along one edge of the dielectric layer. The grooves or incisions 7 on the dielectric layer of FIG. 1b have the same spacing as in FIG. 1a. The metal layers 2 on the dielectric layer of FIG. 1b have the same characteristics as the metal layer 2 in FIG. 1a. However, the positioning of the metal layers 2 in FIG. 1b differs. They are staggered along the length direction of the dielectric layer with respect to the metal layers in FIG. 1a while they also overlap the metal layers in FIG. 1a. This staggering causes the lead portions 4 of the metal layers 2 in FIG. 1b to extend out to the alternate grooves or incisions 7 in FIG. 1b which had remained free of contact with the leads 4 in FIG. 1a.

Figure 2:
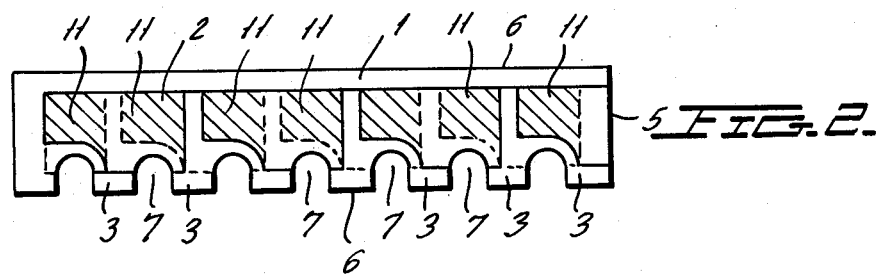
FIG. 2 shows two dielectric layers, in accordance with FIGS. 1a and 1b, which have been superimposed, and illustrates the effect of the staggering of the metal layers on the two dielectric layers.

FIG. 2 shows two dielectric layers, one of FIG. 1a and one of FIG. 1b, stacked upon each other. The metal layers 2 on the two dielectric layers 1 which are both on the same respective surface of the respective dielectric layer. (This is also true for an entire stack of layers 1.) Therefore, all metal layers 2 on each dielectric layer 1 are separated by a dielectric layer 1 from the superimposed metal layers 2 on an adjacent dielectric layer. The overlapping areas 11 of the metal layers 2 of the two adjacent stacked dielectric layers 1 are shown cross-hatched in FIG. 2. The profiles of the complete metal layers are outlined and visible in FIGS. 2, 6 and 7. In order to properly dimension the capacitive network so that it is properly resistive to voltage, the corresponding leads 4 are spaced from the edges of the incision 7 as illustrated.

To manufacture the dielectric layers of FIGS. 1a and 1b, a large sized dielectric layer can be printed with a plurality of metal layer structures or rows of metal layers of the type shown in FIGS. 1a and 1b. Then dielectric layers with metal layers 2 in accordance with FIGS. 1a and 1b can be stacked alternately on each other. The dielectric layers of FIGS. 1a and 1b and the capacitive network of FIGS. 2 and 3, including the incisions or grooves 7 and projections or feet 3 present along one side can be produced by a subsequent stamping process.

Figure 3:
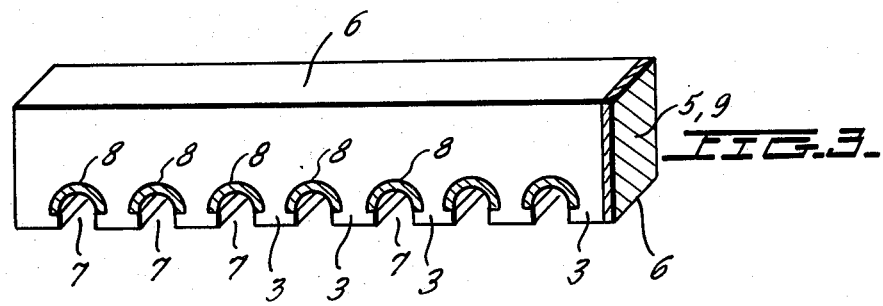
FIG. 3 is a perspective view of a densely sintered ceramic body which is comprised of a stack of dielectric layers in accordance with FIGS. 1a and 1b, wherein the layers of FIGS. 1a and 1b are stacked in alternating staggered form, as shown in FIG. 2, and wherein the ceramic body is covered by unmetallized ceramic cover layers.

FIG. 3 illustrates a built up body of a plurality of stacked dielectric layers 1 printed with metal layers 2 and stacked alternately first with a layer 1 of FIG. 1a and second with another layer 1 of FIG. 1b. Because the dielectric layers are printed with metal layers 2 on only one surface, the built up body is comprised of a plurality of dielectric bodies with superimposed metal layers. The built up body has its grooves or incisions 7 along one side 6 thereof. All the leads 4 of the respective metal layers extend up to their respective incisions or grooves 7. At this time, the entire stack of dielectric layers is sinter fired. Then the leads 4 that are at each aligned set of incisions 7 are connected together in an electrically conductive manner by means of a solderable metallization layer 8 that extends across all dielectric layers. As a result, parallel connection of the stacked overlapping metal layers on alternate dielectric layers is obtained.

Figure 4A:
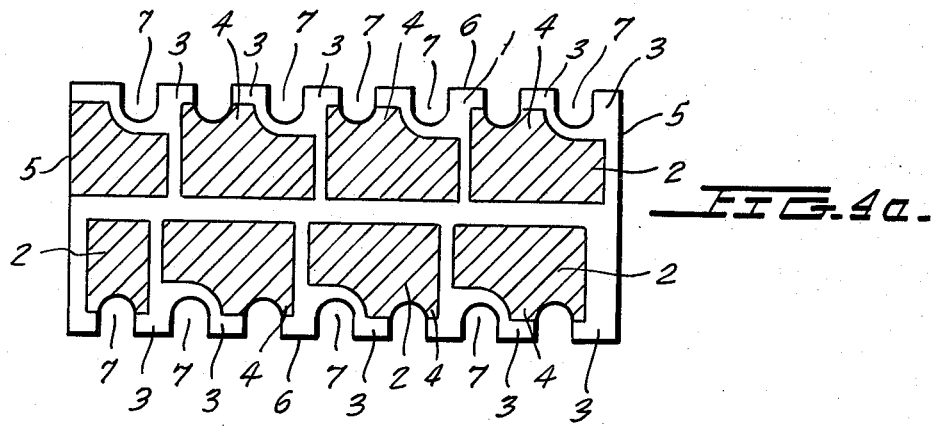
FIG. 4a shows another dielectric layer which has been printed with two rows of individual, separated metal layers.

FIG. 4a shows a much wider dielectric layer 1, which has been printed with two adjacent, longitudinal rows of metal layers 2. Instead of having incisions or grooves along one side edge thereof, the dielectric layer 1 in FIG. 4a has a row of incisions 7 along both side edges 6 thereof. The incisions on both sides are uniformly spaced. Furthermore, the positions of the incisions along the opposite sides are staggered slightly with respect to each other. This all affords the opportunity for spiral winding of a continuous chain of diodes, as is described in connection with FIG. 5 below.

Each row of metal layers 2 in FIG. 4a corresponds to one of the rows of metal layers of FIGS. 1a and 1b. Each metal layer 2 has a respective lead 4 that communicates with one of the two grooves or incisions 7 past which that metal layer 2 extends. Furthermore, the metal layer 2 on one side in one row communicates with one respective groove or incision and the adjacent metal layer in the other row communicates with the next adjacent alternate incision on the other side. Each metal layer along one row is staggered with respect to the adjacent metal layer in the other row by approximately the distance of one incision, keeping in mind that the incisions themselves along opposite sides are staggered.

Figure 4B:
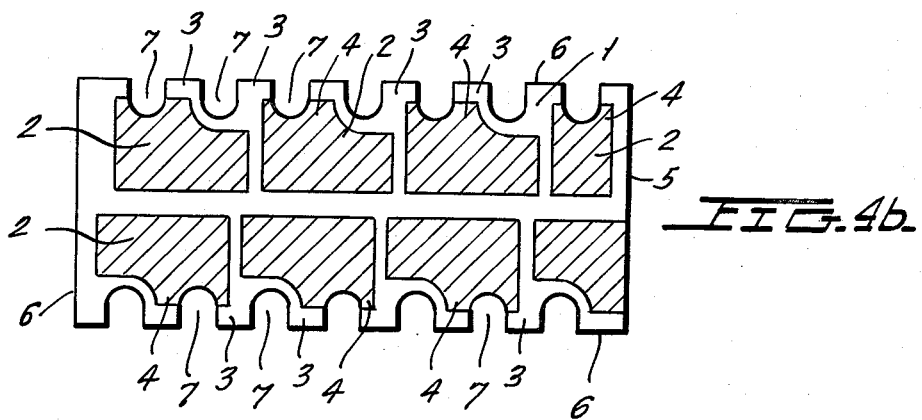
FIG. 4b shows the same type of dielectric layer, with two rows of metal layers, as shown in FIG. 4a, but wherein the positions of the metal layers on the dielectric layer of FIG. 4b are staggered with respect to the positions of the metal layers in FIG. 4a, whereby the metal layers in FIGS. 4a and 4b would overlap if the respective dielectric layers were juxtaposed, as illustrated in FIG. 2 for the first embodiment of dielectric layer.

FIG. 4b illustrates another dielectric layer 1 which is quite like the dielectric layer 1 of FIG. 4a. The dielectric layer 1 of FIG. 4b is also printed with two adjacent rows of metal layers 2 which are identical in structure to the metal layers 2 in FIG. 4a. As was true for FIGS. 1a and 1b, so is it true for FIGS. 4a and 4b that the positions of the metal layers 2 in both rows in FIG. 4b are staggered slightly from the positions of the corresponding metal layers in FIG. 4a so that a metal layer in each row in FIG. 4a will contact a first set of alternate grooves or incisions 7, while the metal layers in FIG. 4b, when the dielectric layers of FIGS. 4a and 4b are stacked, will contact the second alternate set of grooves or incisions. Therefore, the leads in FIG. 4b are staggered by the width of one incision, as compared with FIG. 4a.

Figure 5:
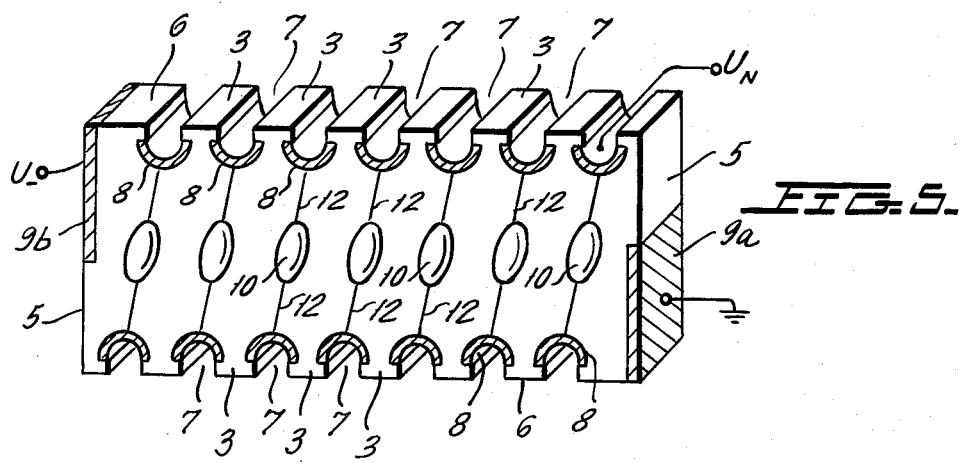
FIG. 5 is a perspective view of a voltage multiplier cascade developed from a stack of dielectric layers in accordance with FIGS. 4a and 4b, wherein the two different dielectric layers alternate and wherein the metal layers of the dielectric layers are connected by a continuous series of diodes.

FIG. 5 shows a capacitive network which is comprised of a stack of dielectric layers, alternating between the dielectric layer of FIG. 4a and the dielectric layer of FIG. 4b and wherein the dielectric layers are stacked as the layers of FIG. 3 are stacked. The incisions or grooves 7 along the top edge 6 of the stack in FIG. 5 are staggered slightly from the incisions along the bottom edge 6 in FIG. 5. In each incision or groove 7 across the entire stack a metallization layer is applied, which electrically connects all respective leads 4 communicating with each incision. The metallization layers have the same characteristics as the metallization layers 8 in FIG. 3.

A continuous chain of diodes 10 is wrapped around the multilayer dielectric body. Each diode has respective lead wires 12 which extend away from the opposite ends thereof and which are soldered to the metallization layers 8 in each of the incisions. The staggering of the incisions 7 between the two sides 6 enables the chain of diodes 10 to be arranged on a continuous wire that is wrapped in spiral form around the stack passing through all of the incisions 7. One side of the spiral winding is illustrated in FIG. 5. No matter how the diodes 10 are connected by lead wires 12 to the metallizations 8, a voltage multiplying cascade is created. $U_n$ is the alternating voltage input and $U_-$ is the direct voltage at the metal layer 9b at one end of the network on the surface 5 there. The metal layer 9a on the other surface 5 of the network is at ground potential.

Figure 7:
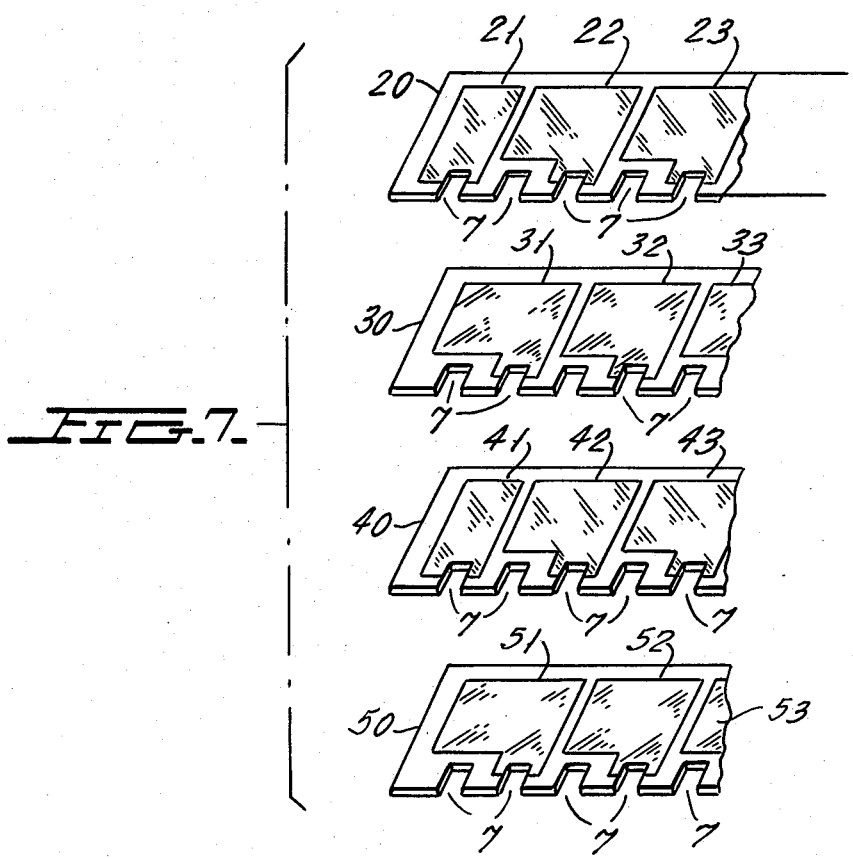
FIG. 7 is an exploded view showing four of the dielectric layers of which the stack in FIG. 6 is comprised.

With reference to FIGS. 6 and 7, the top dielectric layer 20 carries metal layers 21, 22, 23, et al. on its top surface. The dielectric layer also has the grooves 7 defined along the edge.

The next adjacent dielectric layer 30 below the layer 20 also has grooves 7 formed in it and aligned with the corresponding grooves in the other dielectric layers. Metal layers 31, 32, 33, et al. are supported on the top surface of dielectric layer 30.

The next dielectric layer 40 carries respective metal layers 41, 42, 43, et al. on its top surface. The grooves 7 of this dielectric layer are also aligned with the grooves 7 of the other layers. The metal layers 41, 42 and 43 are aligned with and have the same shape as the metal layers 21, 22, 23, respectively, on the alternate dielectric layer 20. As is apparent from the Figures, the metal layers on alternated dielectric layers are aligned.

The metal layers 31, 32, 33 on the intermediate dielectric layer 30 between dielectric layers 20 and 40 are staggered with respect to the positions of the metal layers on the dielectric layers 20, 40, and the respective leads from the metal layers of the dielectric layer 30 communicate with the alternate aligned grooves 7 from the metal layers on the dielectric layers 20, 40.

Finally, the dielectric layer 50 carries respective metal layers 51, 52, 53, et al. on its tip surface. These metal layers are aligned with the metal layers 31, 32, 33, respectively, of dielectric layer 30. The grooves 7 of the dielectric layer are also aligned with the grooves 7 of the other layers.

When the dielectric layers 20, 30, 40 and 50 are stacked with their respective grooves 7 aligned, the metal layers 21, et al., 31, et al., etc. have the positions illustrated in FIG. 6.

To enclose the top and bottom of the assembly in FIG. 6, respective top and bottom cover foils 60, 62 are placed over the dielectric layers.

When the grooves 7 are metallized by metallization 8 of FIG. 3, the metal layers 21, 41, et al. on the first set of alternate dielectric layers 20, 40, et al. are electrically connected and the metal layers 31, 51, et al. on the second set of alternate dielectric layers 30, 50, et al. are electrically connected. The metal layers 21, 22, et al. on dielectric layer 20 are not electrically connected with the metal layers 31, 32, et al. on dielectric layer 30, or else the respective capacitors formed by the cooperating metal layers 21, 31 or 22, 31, or 22, 32, et al. would be short circuited.

Note that the metal layer 31 forms separate capacitors together with both of the metal layer 21 and the metal layer 22, because the metal layer 31 is overlapped by both of the metal layers 21 and 22. Similarly, metal layer 22 forms separate capacitors with both of the metal layer 31 and the metal layer 32, since the metal layer 22 overlaps both of the metal layers 31 and 32. This continues for all of the metal layers on all of the dielectric layers.

Figure 8:
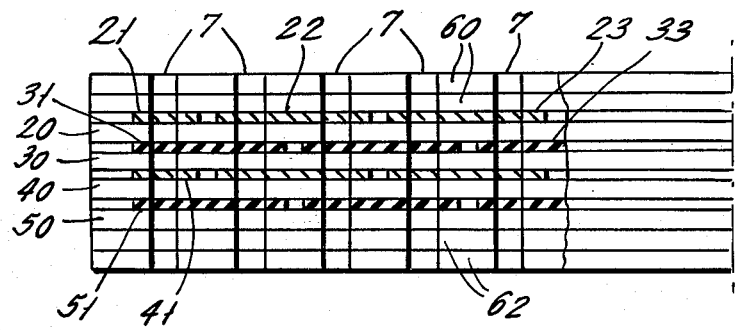
FIG. 8 is a circuit diagram illustrating the capacitor circuit realized using the structure of FIGS. 3 and 6.

FIG. 8 diagrams the resulting capacitors developed by the electrically connected metal layers in FIGS. 6 and 7. It can be seen that the metal layers 21 and 31 define the plates of a respective capacitor 71, that the layers 31, 41 define a capacitor 81, the layers 41, 51 define a capacitor 91, the layers 22, 31 define a capacitor 72, the plates 31, 42 define a capacitor 82, the plates 22, 32 define a capacitor 73, etc. The metal layers 21, 41 are connected in parallel. The respective capacitors 21, 31 are connected in series. The same analysis can be applied to all of the other individual metal layers and the individual capacitors they define, as shown in FIGS. 8 and 9. Thus, the invention provides a capacitive network.

The structures and networks shown in the drawing Figures do not correspond to actual dimensions. They have been shown greatly enlarged.

Although the present invention has been described in connection with preferred embodiments thereof, many variations and modifications will now become apparent to those skilled in the art. It is preferred, therefore, that the present invention be limited not by the specific disclosures herein, but only by the appended claims.

What is claimed is:

1. A capacitive network comprising:

a plurality of dielectric layers stacked facewise atop one another, each of said dielectric layers being comprised of a thin plate of dielectric material, said plate having edges;

a series of grooves formed along at least one said edge of each of said dielectric layers, each of said grooves including a base portion opposite said one edge; said dielectric layers being shaped and relatively positioned so that a respective said groove of each said dielectric layer is aligned with the same respective said groove of all other said dielectric layers such that a plurality of groove columns are formed;

a row of metal layers being supported on each said dielectric layer; said metal layers being arrayed and spaced apart along the same direction as said grooves; each said metal layers including a lead portion thereof extending to a respective said groove that is adjacent that said metal layer on said dielectric layer; said metal layers being shaped, spaced and positioned so that a respective said lead portion extends to only one of one set of alternate ones of said grooves; said metal layers being supported on their respective said dielectric layers such that between a said dielectric layer and its adjacent said dielectric layers, said dielectric material is interposed between the said metal layers on adjacent said dielectric layers;

the respective said metal layers of adjacent said dielectric layers being placed so that said metal layers of adjacent said dielectric layers have overlapping surface areas and said metal layers being so placed that said lead portions of said metal layers of one said dielectric layer extend to a first set of alternate grooves and said lead portions of said metal layers of the adjacent said dielectric layer extend to a second alternate set of said grooves, wherein each said groove of said second set is between a respective pair of grooves of said first set of said alternate grooves;

a plurality of conductor means each associated with a respective one of said groove columns, each said conductor means located in its associated groove column and extending across said base portion of said grooves and electrically joining all said lead portions extending to the grooves of said associated groove column; and a plurality of diodes connected in series between adjacent said grooves, said diodes having electric leads that are soldered at and to said conductor means located at the base of said grooves.

2. The capacitive network of claim 1, wherein all said metal layers generally have the same length along their respective said dielectric layers; said metal layers on adjacent said dielectric layers are staggered in position along said dielectric layers so that said first alternate grooves are contacted by said lead portions of said metal layers of said first dielectric layer and said second alternate grooves are contacted by said lead portions of said metal layers of said second dielectric layer.

3. The capacitive network of claim 2, wherein all said metal layers are shaped the same.

4. The capacitive network of claim 1 or 2, wherein said metal layers of each said dielectric layer are applied on one surface of the respective said dielectric layer.

5. The capacitive network of either of claims 1 or 2, wherein each said conductor means comprises a metallization layer extending across all said dielectric layers.

6. The capacitive network of either of claims 1 or 2, wherein along said edge of said dielectric layers, said grooves are uniformly spaced apart.

7. The capacitive network of any of claims 1, 2 or 3, wherein each said metal layer extends a distance along its said dielectric layer of about two said grooves.

8. The capacitive network of claim 7, wherein each said conductor means comprises a metallization layer extending across all said dielectric layers along said base of said grooves and said diode leads are soldered to respective said metallization layers.

9. A capacitive network comprising:
a plurality of metal layer carrying dielectric layers, stacked facewise atop one another, each said dielectric layer being comprised of a thin plate of dielectric material, said plate having first and second opposite edges;

a series of grooves formed along said first and second edges, each of said grooves including a base portion located between said first and second edges; said dielectric layers being shaped and relatively positioned so that a respective said groove of each said dielectric layers is aligned with the same respective said groove of all other said dielectric layers such that a plurality of groove columns are formed;

two rows of metal layers being supported on each said dielectric layer; said metal layers of each said row thereof being arrayed and spaced apart along the same direction as said grooves;

each said metal layer including a lead portion thereof extending to a respective said groove that is adjacent that said metal layer and that is at the said edge of said dielectric layer closer to the respective said row of said metal layers; said metal layers in each said row being shaped, spaced, and positioned so that a respective said lead portion extends to only one of one set of alternate ones of said grooves along the adjacent said edge of said dielectric layer; said metal layers being supported on their respective said dielectric layers such that between a said dielectric layer and the adjacent said dielectric layers, said dielectric material is interposed between the said metal layers on adjacent said dielectric layers;

the respective said metal layers of adjacent said dielectric layers being placed so that said metal layers of the same respective said row thereof of adjacent said dielectric layers have overlapping surface areas and said metal layers in said row thereof being so placed that said lead portions of the said metal layers in one said row on one said dielectric layer contact a first set of alternate said grooves at the adjacent said edge and said lead portions of said metal layers in the same respective said row of the adjacent said dielectric layer contact a second alternate set of said grooves at the same adjacent said edge, wherein each said contact area of said second set is located between a respective pair of said first set of alternate grooves;

a plurality of conductor means each associated with a respective one of said groove columns, each said conductor means located in its associated groove column and extending across said base portion of said grooves and electrically joining all said lead portions extending to the grooves of said associated groove column; and a respective diode connected between alternate groove columns located on opposite said edges of said stacked dielectric layer, said diodes having leads, said leads being soldered at and to said conductor means located at said base portion of said grooves.

10. The capacitive network of claim 9, wherein all said metal layers generally have the same length along their respective said dielectric layers; said metal layers on the same respective said row thereof on adjacent said dielectric layers are staggered in position along said dielectric layers so that said first alternate grooves along one said edge of said dielectric layer are contacted by said lead portions of said metal layers of said row thereof adjacent said one edge on said first dielectric layer and said second alternate grooves on said one edge are contacted by said lead portions of the same said row of said metal layers but on said second dielectric layer.

11. The capacitive network of claim 9, wherein said metal layers of each said dielectric layer are applied on one surface of the respective said dielectric layer.

12. The capacitive network of claim 9, wherein all said metal layers are shaped the same.

13. The capacitive network of claim 8, wherein each said conductor means comprises a metallization layer extending across all said dielectric layers.

14. The capacitive network of either of claims 9 or 10, wherein along the respective said edge of said dielectric layers, said grooves are uniformly spaced apart and along both said edges of said dielectric layer, said grooves are uniformly spaced apart.

15. The capacitive network of claim 9, wherein said diodes are in a continuous chain with respective electric leads from each said diode extending between adjacent said diodes, and said electric leads being connected to said conductor means located at said base portion of said grooves.

16. The capacitive network of either of claims 9 or 10, wherein each said metal layer extends a distance along its said dielectric layer of about two said grooves.

* * * * *